_United States Patent_ [19]

Stafford et al.

[11] 4,263,648

[45] Apr. 21, 1981

[54] SPLIT SYSTEM BUS CYCLE FOR DIRECT MEMORY ACCESS OF PERIPHERALS IN A CATHODE RAY TUBE DISPLAY SYSTEM

[75] Inventors: John P. Stafford; Richard A. Slater, both of Nashua, N.H.; Frederick E. Kobs, Pepperell, Mass.; Joseph L. Ryan, Nashua, N.H.

[73] Assignee: Honeywell Information Systems Inc., Waltham, Mass.

[21] Appl. No.: 973,290

[22] Filed: Dec. 26, 1978

[51] Int. Cl.³ ............................ G06F 1/04; G06F 3/00
[52] U.S. Cl. ................................................. 364/200
[58] Field of Search ... 364/200 MS File, 900 MS File; 307/269; 328/59, 63

[56] References Cited

U.S. PATENT DOCUMENTS

| | | | |
|---|---|---|---|
| 3,962,682 | 6/1976 | Bennett | 364/200 |
| 4,004,283 | 1/1977 | Bennett et al. | 364/200 |
| 4,041,469 | 8/1977 | Jennings | 364/900 |
| 4,075,695 | 2/1978 | Lelke | 364/200 |
| 4,121,283 | 10/1978 | Walker | 364/200 |

OTHER PUBLICATIONS

"M6800 Microprocessor Application Manual", Motorola Inc., 1975, pp. 4-1 to 4-13, 4-31 to 4-42, 6-10 to 6-12.

_Primary Examiner_—Joseph M. Thesz
_Assistant Examiner_—Eddie Chan
_Attorney, Agent, or Firm_—George Grayson; Nicholas Prasinos; Ronald T. Reiling

[57] ABSTRACT

Apparatus in a Cathode Ray Tube (CRT) display allows the sharing of the system bus between the microprocessor (CPU) and Direct Memory Access (DMA) devices without degrading the CPU performance by splitting the system bus cycle into an address phase and a data phase.

2 Claims, 10 Drawing Figures

SPLIT SYSTEM BUS CYCLE FOR DIRECT MEMORY ACCESS OF PERIPHERALS IN A CATHODE RAY TUBE DISPLAY SYSTEM

BACKGROUND OF THE INVENTION

1. Field of the Invention

This invention relates generally to cathode ray tube display systems and more particularly to apparatus that provides the bus cycle timing.

2. Description of the Prior Art

An article written by Joseph Nissam entitled "DMA Controller Capitalizes on Clock Cycles to Bypass CPU" appears on pages 117-124 of the January, 1978 issue of *Computer Design*. The article summarizes the prior art by describing several DMA transfer methods including the halt method, the multiplex DMA/CPU method and the "cycle steal" method. In the halt method, the CPU is shut down while the DMA transfer occurs. Its disadvantage is the relatively long time it takes to switch the CPU on and off the bus. The multiplex DMA/CPU method splits each memory cycle into two time slots, one for the CPU and the other for the DMA. This method, however, requires high speed memories for high performance. The "cycle steal" method is best for the applications considered in the above article. This has the disadvantge, however, of slowing CPU operation when DMA devices hog the memory.

OBJECTS OF THE INVENTION

Accordingly, it is an object of this invention to provide a CRT display system with improved throughput.

It is another object of this invention to provide apparatus to split the system bus into an address phase and a data phase to improve system throughput.

It is still another object of this invention to provide apparatus to split the system bus into an address phase and a data phase, whereby the address time shares a bus cycle with the data phase response of the address request of the previous cycle to improve system throughput.

SUMMARY OF THE INVENTION

These objects are accomplished in a preferred embodiment of the invention. In a CRT display system, many memory cycles are required to refresh the display. For a 24 line by 30 character per line and a 60 hertz refresh rate, a minimum of 115,200 bus cycles per second are required. With higher density displays and additional character reads for visual attributes, this rate may be significantly higher. Other peripherals operating in a DMA mode such as disk controllers also add to the system bus throughput requirements. Apparatus divides the system bus timing into alternate CPU cycles and Direct Memory Access (DMA) cycles. In the preferred embodiment, the duration of each CPU cycle and each DMA cycle is typically 508.5 nanoseconds. DMA cycles are used by peripheral subsystems to communicate with memory.

The system bus timing is further split into an address phase and a data phase which are offset from each other typically 305 nanoseconds. That is, the address phase is divided into alternate CPU and DMA cycles of typically 508.5 nanoseconds each and the data phase is divided into alternate CPU and DMA cycles lagging the address phase by the above 305 nanoseconds. An oscillator operating at a frequency of 19.66 megahertz provides the basic timing for the system bus logic by controlling a number of shift registers wired in series to provide timing pulses which set and reset a number of timing flops in a timed sequence. The CPUADR flop when set defines the CPU address phase and when reset defines the DMA address phase of the system bus cycle. The CPUDAT flop when set defines the CPU data phase and when reset defines the DMA data phase of the system bus cycle.

Other timing flops define a number of other signals on the system bus and are described in the detailed specification.

DESCRIPTION OF THE PREFERRED EMBODIMENT

Figure 1:
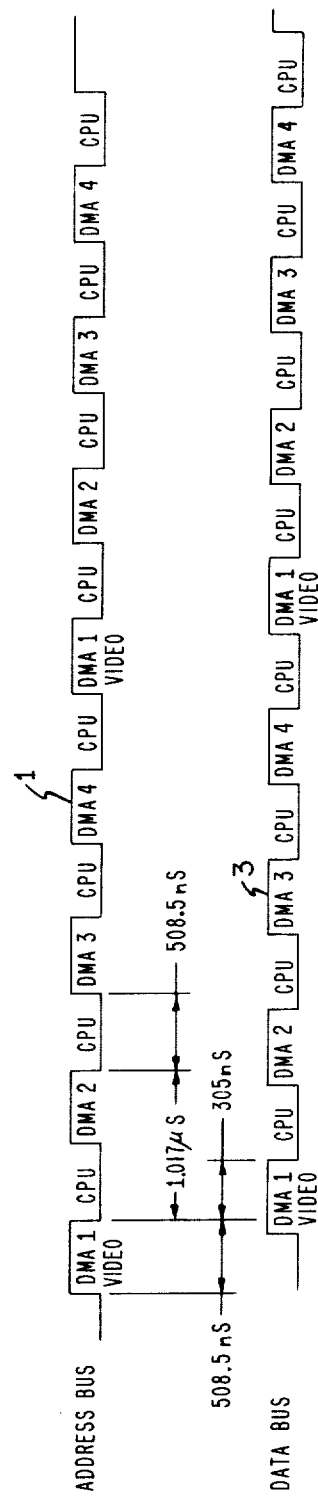
FIG. 1 shows the system bus cycle timings of the preferred embodiment.

In the preferred embodiment shown in FIG. 1, the system bus timing is divided into an address phase 1 and a data phase 3 with the data phase 3 lagging the address phase 1 by typically 305 nanoseconds. Both the DMA and CPU cycles are typically 508.5 nanoseconds long. Successive CPU cycles are 1.017 microseconds apart.

Figure 2:
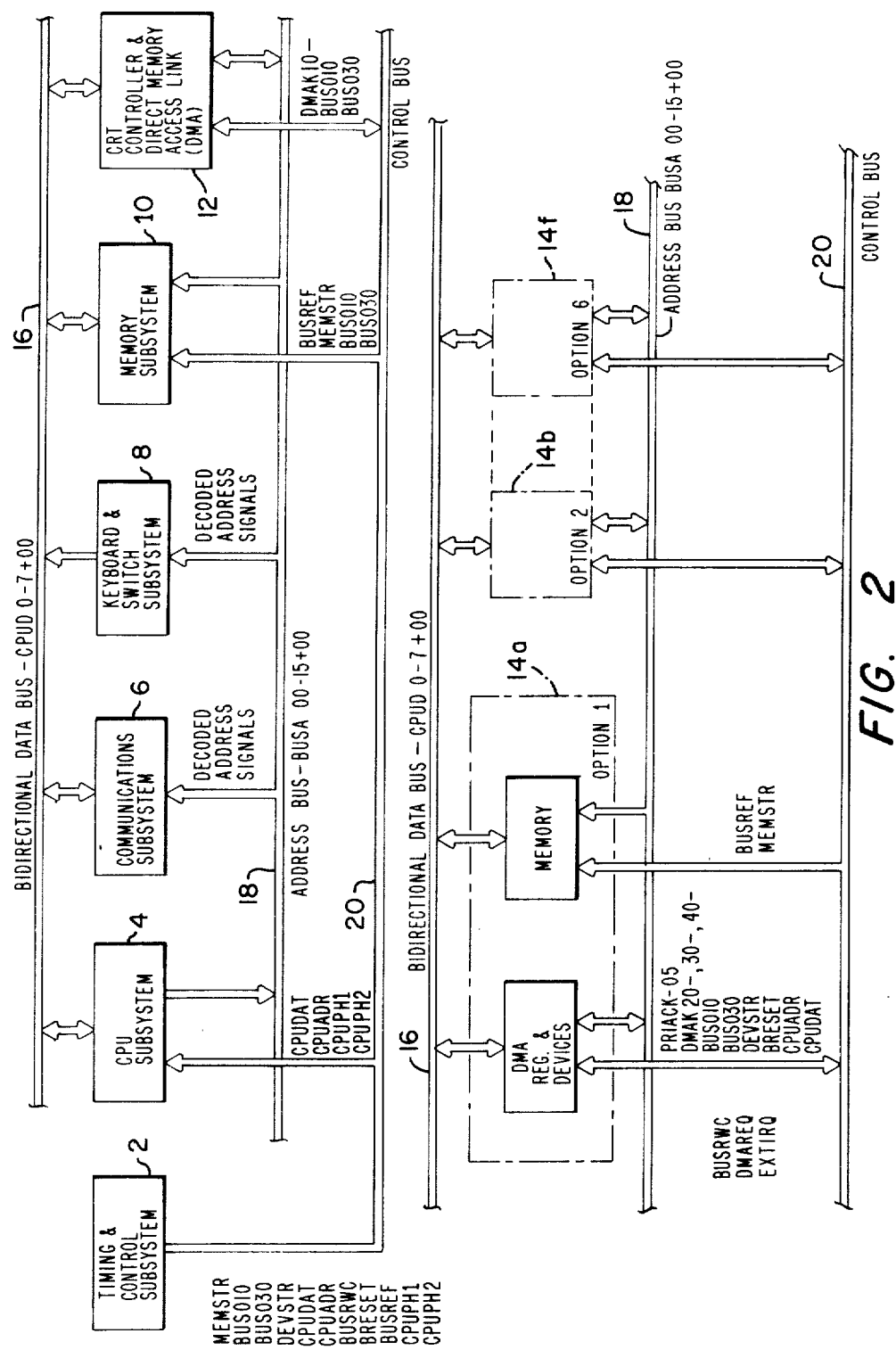
FIG. 2 is an overall block diagram of the system.

A central processor 4 of FIG. 2 is operative during CPU cycles. Peripheral subsystems 14a-f are preassigned to be operative during DMA cycles. The cathode ray tube subsystem 12 is exclusively preassigned to be operative during DMA1 cycles, since the CRT display requires continuous updating from memory subsystem 10.

FIG. 2 shows the overall system comprising a timing and control subsystem 2, the central processor unit (CPU) subsystem 4, a keyboard and switch subsystem 8, the memory subsystem 10, the CRT controller and direct memory access (DMA) link 12, and a number of optional peripheral devices typically 14a-f connected to a bidirectional data bus 16, an address bus 18 and a control bus 20.

The timing and control system 2 generates the cycle timing for the address bus 18 and the data bus 16 as shown in FIG. 1 for address phase 1 and data phase 3, and for the control bus 20.

The memory subsystem 10 comprises 8,192 word locations of random access memory (RAM) and 20,480 word locations of read only memory (ROM). The ROM stores microprogram subroutines that control overall system operation. Sections of RAM are set aside as registers, buffers and word areas. The memory subsystem 10 is operative during both CPU and DMA bus cycles. Memory address locations identified by signals BUSA00−15+00 are received over address bus 18, and during a memory read cycle a data word CPUD0−7+00 is sent out over data bus 16. During a memory write cycle the data word CPUD0−7+00 is received over data bus 16.

The signal lines BUSA00−15 identify each of the 16 address lines of address bus 18. Address signals BUSA00−15+ indicate that a signal line is at a binary ONE when the signal on the line is high. BU- SA00−15+00 identifies the address signals BUSA00−15+as being on the 00 bus.

The CPU subsystem 4 is operative with data bus 16 and address bus 18 during CPU cycle time to read from or write to the memory subsystem 10 or a peripheral device 14a-f. The CPU subsystem 4 controls overall system operation by means of the microprogram subroutines stored in the memory subsystem 10 ROM. The CPU subsystem 4 receives microwords over signal lines CPUD0−7+00 on data bus 16 in response to address signal BUSA00−15+00 sent out on address bus 18 by CPU subsystem 4. The CPU subsystem 4 may also read or update RAM areas of memory subsystem 10 at the address location identified by the BUSA00−15+00 signal sent from the CPU subsystem 4 over address bus 18.

The microprogram subroutines are not a part of the invention. They will be described only as necessary to understand the operation of the overall system.

The keyboard and switch subsystem 8 inputs information in the form of data words or control codes onto the data bus 16 during CPU cycle time. This information was initiated as a result of the manual operation of a keyboard or the manual operation of switches and is processed by microprogram control by the CPU subsystem 4.

The communications subsystem 6 is operative during CPU cycle time. It operates in synchronous or asynchronous mode and can transmit or receive information. Host systems may be connected to the communications subsystems 6. Therefore, all information on data bus 16 during CPU cycle time passes through the communications subsystem 6 under microprogram control in the event the information is to be transmitted to the host system.

The CRT controller and direct memory access (DMA) link 12 is operative during DMA1 cycles, FIG. 1. Successive memory address locations identified by signals BUSA00−15+00 are sent to memory subsystem 10 over the address bus 18 from the CRT controller and DMA link 12 for each displayed line. Control information and data characters for display are sent from memory subsystem 10 over data bus 16 to the CRT controller and DMA link 12.

A number of options such as buffered printers, diskettes, extended memory, and HDLC communications are connected to the system as options 14a-f. The options 14a-f are operative to communicate with memory subsystem 10 during DMA 2-4 cycle time. Each option 14a-f is internally wired to a particular DMA 2, 3 or 4 cycle time.

Certain BUSA00−15+00 signals address areas in RAM of memory subsystem 10. These areas are set aside as registers. These addresses are decoded as signal lines and are sent to individual subsystems over address bus 18 to indicate to the subsystem that a particular register in memory subsystem 10 is being accessed. These signals are not pertinenet in the understanding of the inventin but are described in detail where necessary to understand the operation.

The timing and control subsystem generates and receives control signals over a control bus 20. Those signals are described below.

CPUADR−00—CPU Address Control

This signal defines the DMA and the CPU bus cycle timing of address bus 18. When the signal is low, the CPU address lines are gated to the address bus 18. When high, the DMA address lines are gated to the address bus 18.

CPUDAT−00—CPU Data Control

This signal defines the DMA and the CPU bus cycle timings. When the signal is low, the CPU controls the direction and purpose of the data bus 18. When the signal is high, the DMA devices control the data bus 18.

BUSRWC+00—Bus Read Write Control

This signal defines the type of data transfer on the data bus 16. It is valid during the CPUADR time for that phase of the bus cycle. During the CPU phase, the signal at logical ONE indicates that data is to be read from a device such as communications subsystem 6 or memory subsystem 10 to the CPU subsystem 4 over data bus 16. The signal at logical ZERO indicates that data is to be written from the CPU subsystem 4 to the DMA device 14a-f or memory subsystem 10 over data bus 16. During the DMA phase, the signal at logical ONE indicates that data is to be read from memory subsystem 10 and sent to a DMA option device 14a-f over data bus 16. The signal at logical ZERO indicates that data is to be sent to the memory subsystem 10 over data bus 16 from the DMA device 14a-f.

MEMSTR−00—Memory Strobe

This signal provides internal timing pulses for memory subsystems during CPU and DMA bus cycles.

DEVSTR−00—Device Start

This signal is used by the optional devices 14a-f as a clock pulse.

BUS010−00—Bus Strobe 1

This signal is used by the optional devices 14a-f as a clock pulse.

BUS030+—Bus Strobe 3

This signal enables the memory subsystem 10 output during read operation when at a logical ONE during CPU and DMA bus cycles. The signal is also available to options 14a-f for timing.

BUS030−—Bus Strobe 3

This signal when at logical ZERO during DMA bus cycles activates the CRT controller and DMA link 12 write operation.

DMAREQ—DMA Request

There are 4 DMA request signal lines. DMAREQ+01 is assigned to the CRT controller and DMA link 12. Signal lines DMAREQ−02, DMAREQ−03 and DMAREQ−04 are available to specific options 14a-f. As shown in FIG. 1, there are 4 DMA bus cycle time slots DMA1, DMA2, DMA3 and DMA4. A subsystem requests its assigned DMA bus cycle by forcing its DMAREQ signal to logical ZERO.

DMAKXO−—DMA Acknowledge

Four DMA acknowledge signals DMAK10−, DMAK20−, DMAK30− and DMAK40− define their respective time slots on the control bus by being forced to a logical ZERO.

EXTIRQ—00—External Interrupt Request

This signal when at logical ZERO indicates that an option 14a-f is interrupting and is requesting service of the CPU subsystem 4.

PRIACK—05—External Interrupt Acknowledge

This signal when at logical ZERO acknowledges the External Interrupt Request.

BRESET—00—Bus Reset

This signal is used by the CPU subsystem 4 to clear registers and reset flops throughout the system. It is operative when at logical ZERO.

BUSREF+00—Bus Refresh Line

This signal when at logical ONE initiates a memory refresh cycle. It is active for 1 DMA1 cycle every 16 microseconds.

Figure 3A:
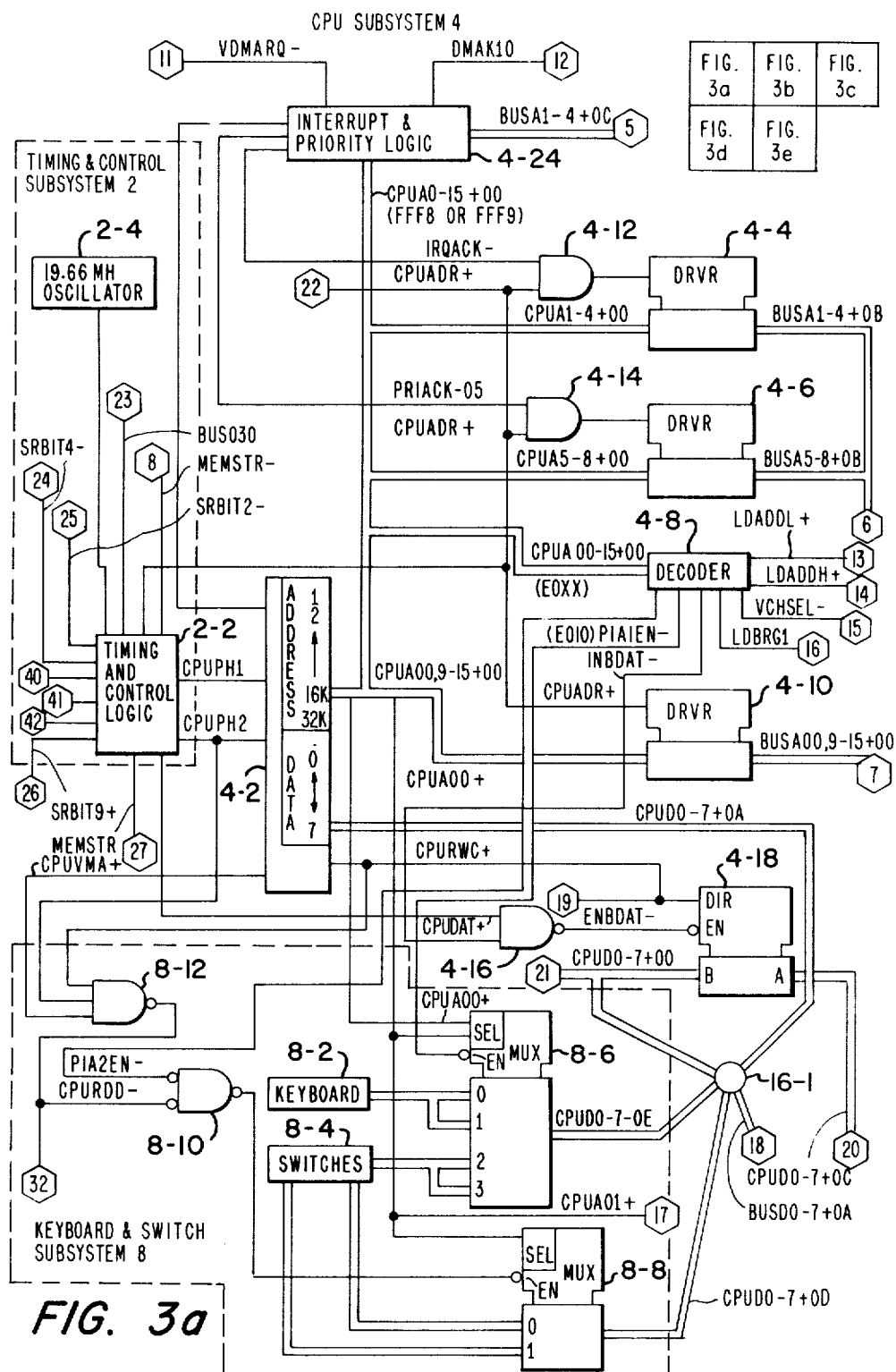
FIG. 3 is a block diagram of the system showing the address bus and data bus signal lines.

FIG. 3 is a detailed block diagram of the system and is organized as FIGS. 3a-3e. The subsystems of FIG. 2 are shown separately on FIGS. 3a-3e. Referring to FIG. 3a, the timing and control subsystem 2 comprises an oscillator 2—4 and timing and control logic 2—2. The oscillator provides a square wave signal to the timing and control logic 2—2 which in the preferred embodiment is 19.66 megahertz. The timing and control logic 2—2 provides the logic signals which control the address bus 18, the data bus 16, and the control bus 20 signal timings.

Timings and control logic 2—2 generates 2 timing signals CPUPH1 and CPUPH2 which control the timing of a microprocessor (CPU) 4-2. CPU 4-2 is a Motorola MC68A00 microprocessor described in "Specification DS9471" dated 1978, published by Motorola Semiconductors, 3501 Ed Bluestein Blvd., Austin, Texas, 78721.

The CPU subsystem 4 comprises the microprocessor 4-2 which generates address signals CPUA00−15+00 and generates and receives data signals CPUD0−7+0A. The address signals CPUA1−4+00 are applied to a driver 4—4 which is enabled by an output signal of a NAND gate 4-12. The address signals CPUA5−8+00 are applied to a drive 4-6 which is enabled by an output signal of an AND gate 4-14. The address signals CPUA00,9−15+00 input a driver 4-10 which is enabled by control bus 20 signal CPUADR+ which is generated in timing and control logic 2—2. Address signals CPUA0−15+00 input interrupt and priority logic 4-24 if the CPU 4-2 address is in the hexadecimal form FFF8 or FFF9. These address locations are modified in interrupt and priority logic 4-24 to identify the subsystem requesting an interrupt of the CPU subsystem 4. Since the interrupt function is not a part of this invention, it will be described only as necessary for understanding the description of the inventin. Address signals CPUA00−15+00 if in the hexadecimal form of memory locations EOXX are applied to decoder 4-8. Address EOXX defines a register in the memory subsystem 10.

Logic signal CPUADR+ is applied to AND gates 4-12 and 4-14. Logic signal IRQACK−, another input to AND 4-12, is low when the CPU 4-2 responds to an interrupt by sending address FFF8 or FFF9 to interrupt and priority logic 4-24. This suppresses the output of driver 4—4, signals BUSA1−4+0B, and enables the interrupt and priority logic 4-24 output signals BUSA1−4+0C onto the address bus 18. Logic signal PRIACK-05, another input to AND 4-4, is low during an external device interrupt; that is, when the control bus 20 signal EXTIRQ-00 is low. This suppresses the output of drivers 4—4 and 4-6, address signals BUSA1−8+0B, from appearing on address bus 18. The external device option 14a-f, FIG. 3c, inputs signals BUSA1−8+00 from the address bus 18. The output of driver 4-10, signals BUSA00,9−15+0B, appears on address bus 18 when logic signal CPUADR+ is high. Signal CPUADR+ provides the timing for the address output signals of CPU 4-2 onto address bus 18.

Data signals CPUD0−7+0A connect between CPU 4-2 and junction 16-1 on data bus 16 which connects to the B input of a transceiver 4-18. Logic signal CPURWC+ connects between the CPU 4-2 and the direction (DIR) input of the transceiver 4-18. When signal CPURWC+ is high, data is applied to the CPU 4-2. When signal CPURWC+ is low, then data is received from the CPU 4-2. Logic signals CPUDAT+ and INBDAT- input a NAND gate 4-16 whose output, logic signal ENBDAT-, inputs the enable terminal of transceiver 4-18. Logic signal INBDAT- is an output of decoder 4-8 and enables the transceiver 4-18 when the CPU 4-2 is addressing a register in memory subsystem 10 associated with the CRT controller and DMA link 12.

Figure 3B:
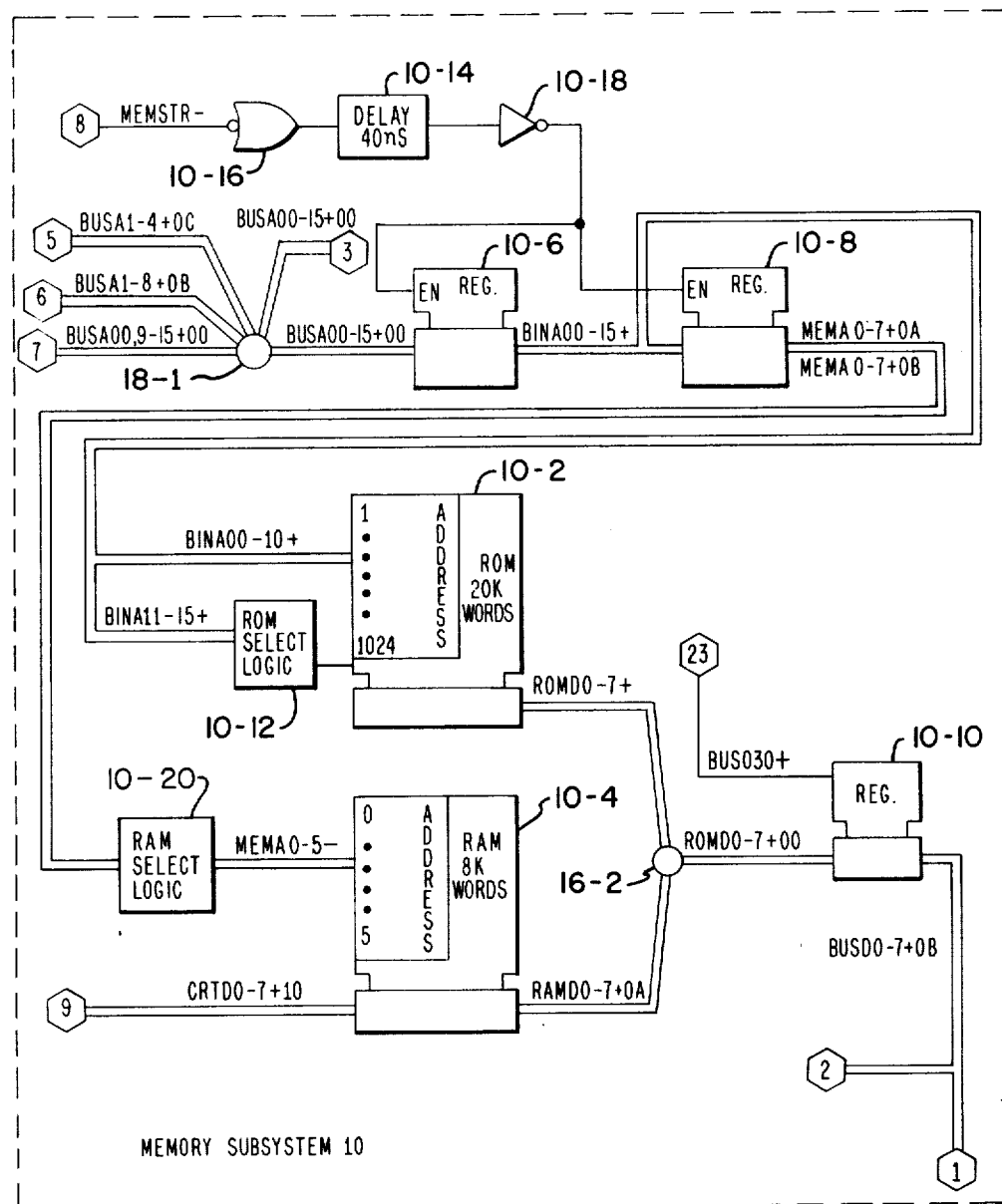

The memory subsystem 10, FIG. 3b, comprises 20K words of read only memory (ROM) 10-2 and 8K words of random access memory (RAM) 10-4. ROM 10-2 is made up of ten 2716 circuits described in the *Intel Data Catalog*, copyright 1977, published by Intel Corporation, 3065 Bowers Ave., Santa Clara, CA 95051. Each ROM 10-2 circuit stores 8 bits in each of 2048 address locations. RAM 10-4 is made up of sixteen 2104A circuits described in the above *Intel Data Catalog*. Each RAM 10-4 circuit stores 1 bit in each of 4096 address locations.

Address bus 18 signals BUSA00−15+00 input a register 10-6 whose output signals BINA00−15+ input a register 10-8. The output signals BINA00−10+ input the ROM 10-2 address terminals and BINA11−15+ input a ROM select logic 10-12. ROM select logic 10-12 selects 1 of 10 ROM 10-2 memory chips. Signal BINA00−10+ selects 1 of 2048 address locations. in the selected ROM 10-2 memory chip.

The register 10-8 output signals MEM0−7+0A are applied to RAM select logic 10-20 on a first cycle and output signals MEMA0−7+0B are applied to RAM select logic 10-20 on a second cycle. The RAM select logic 10-20 output signals MEMO0−5− are applied to RAM 10-4 to select 1 to 4096 address locations. The first and second cycle selection logic is not shown since it is not pertinent to the understanding of the invention. Registers 10-6 and 10-8 are enabled by the following logic circuit. Control bus 20, signal MEMSTR−, inputs a NOR 10-16 whose output is delayed 40 nanoseconds by a delay line 10-14, inverted by an inverter 10-18 and input to the enable terminal of registers 10-6 and 10-8.

The output of ROM 10-2 and RAM 10-4, data signals ROMD−7+ and RAMD0−7+0A, is applied through a junction 16-2 to a register 10—10, which is enabled for the time the bus enable signal BUS30+ is high. The output of register 10—10, data signal BUSD0−7+0B, is applied through a junction 16-3, FIG. 3d, to the B terminal of a transceiver 12-4, and the A terminal of a transceiver 4-18, FIG. 3a. Transceiver 4-18 connects the memory subsystem 10 data output to data bus 16 for connection to CPU 4-2. Transceiver 12-4 connects the data output of memory subsystem 10, data signals BUSD0−7+0B, to CRT controller and DMA link 12.

The keyboard and switch subsystem 8, FIG. 3a, comprises a keyboard 8-2, a plurality of switches 8-4, a multiplexer 8-6 and a multiplexer 8—8. The keyboard 8-2 and switches 8-4 connect to inputs of MUX 8-6 and 8—8. The output of the MUX's data signals CPUD0−7+0D and CPUD0−7+0E connects to junction 16-1 of data bus 16. The MUX 8-6 is enabled by a decoded address signal PIA1EN− which is generated by decoder 4-8. MUX 8—8 is enabled by the output of NAND 8-10 whose inputs are signals PIA2EN− generated by decoder 4-8 and CPURDD−, an output of CPU 4-2. Under control of CPU 4-2, an address signal CPUA00−15+00 in the form of hexadecimal address E010 received by decoder 4-8 results in logic signal PIA1EN− being forced low to enable MUX 8-6. In a similar manner, hexadecimal address E020 causes logic signal PIA2EN− to be forced low in the decoder 4-8, thereby enabling MUX 8—8 when a logic signal CPURDD−, the read data signal, is forced low. Logic signal CPURDD− is generated by a NAND gate 8-12 from the input signals CPUVMA+ indicating a valid address on the address bus 18, the CPURWC+ indicating a write into CPU 4-2 operation and the CPUPH2 timing signal. Address line CPUA00+ inputs a SELECT terminal 1 of MUX 8-6 and address line CPUA01+ inputs a SELECT terminal 2 of MUX 8-6 and a SELECT terminal of MUX 8—8. These address signals select the keyboard and/or switch outputs for connection to junction 16-1 of data bus 16.

Figure 3C:
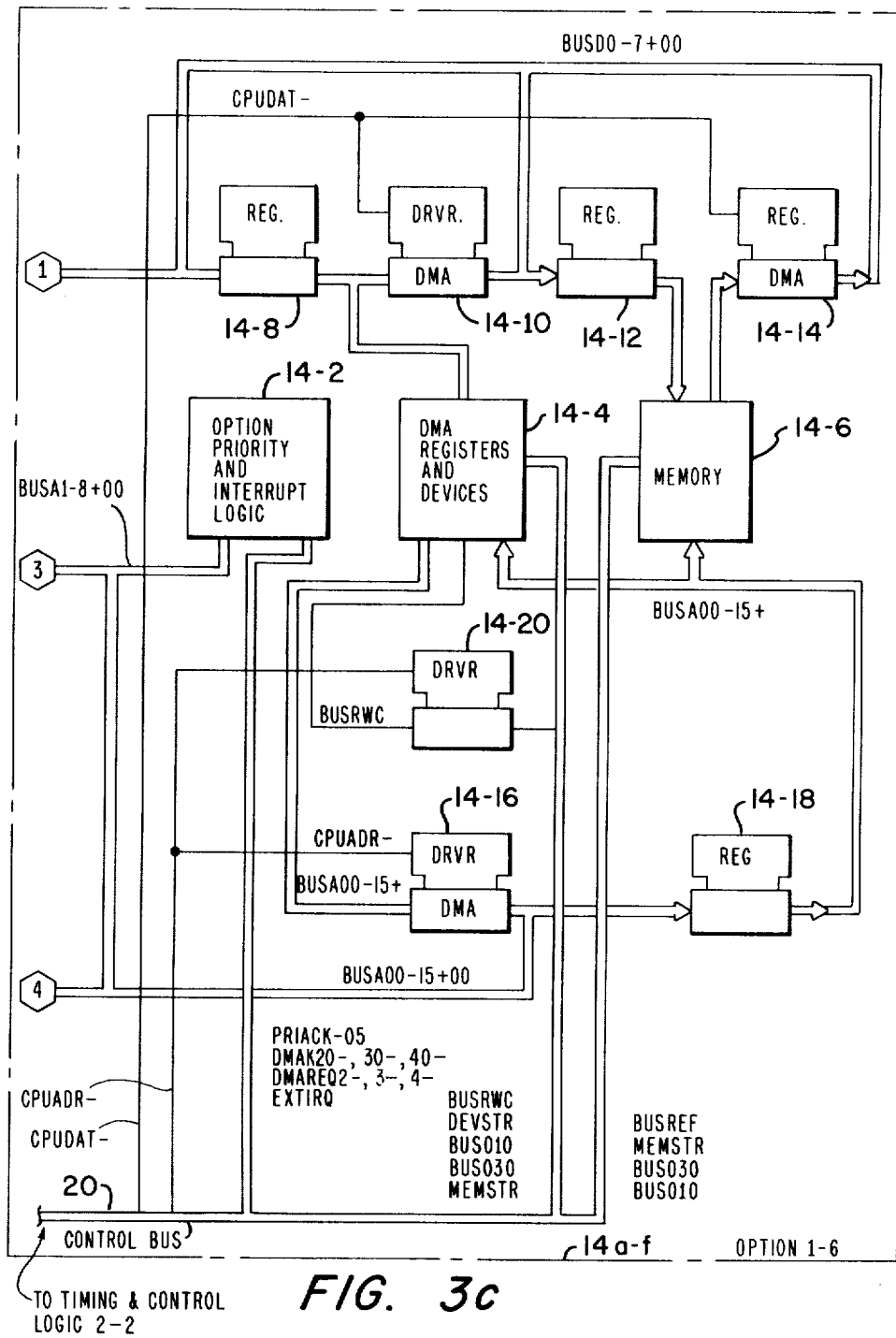
Figure 3D:
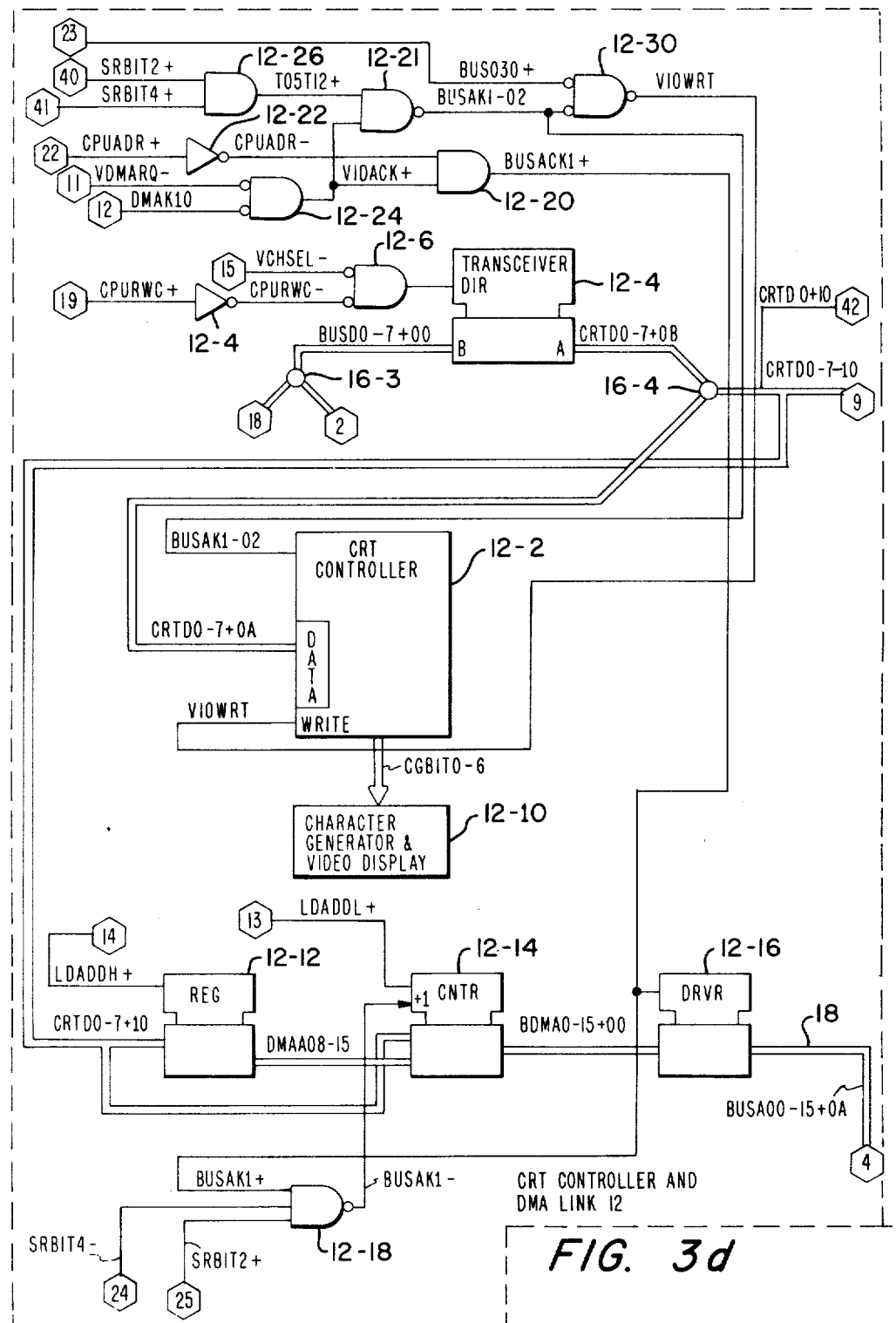
Figure 3E:
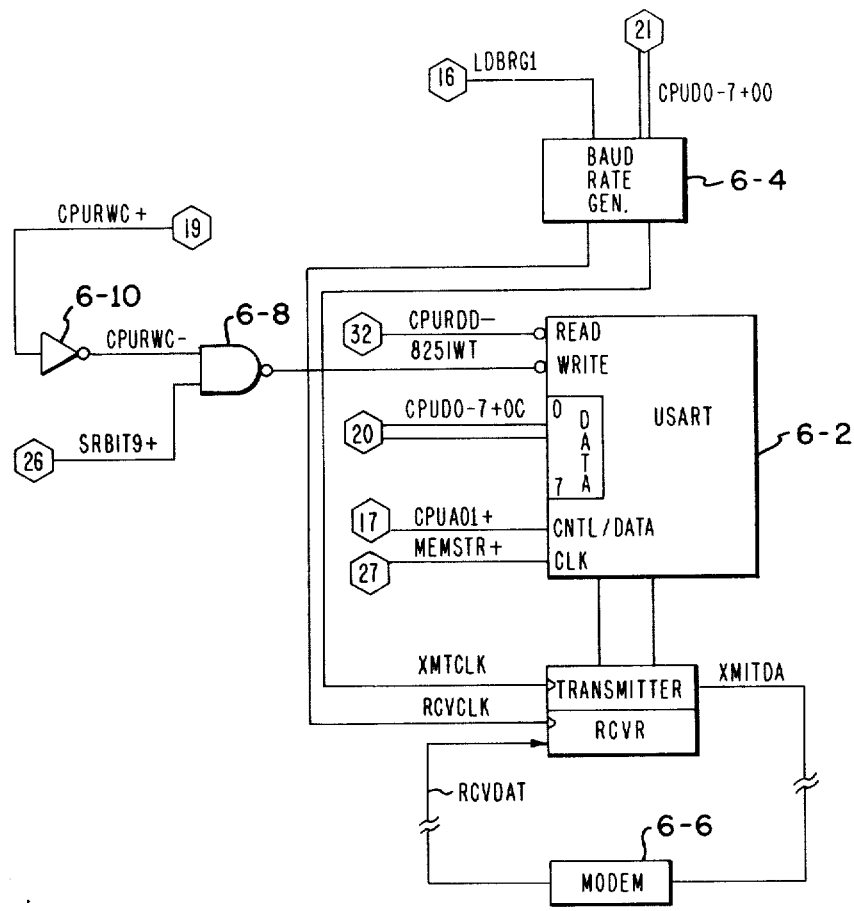

The communications subsystem 6, FIG. 3e, comprises a universal synchronous, asynchronous receiver transmitter (USART) 6-2, a baud rate generator 6-4 and an external device such as modem 6—6. The USART 6-2 is an 8251 communication interface described in the above *Intel Data Catalog*. The baud rate generator 6-4 provides the receive clock timing signal RCVCLK and the transmit clock timing signal XMTCLK for the USART 6-2. The baud rates are loaded into the baud rate generator 6-4 under CPU 4-2 control. CPU 4-2 sends out a hexadecimal address E030 on address bus 18 which is decoded in decoder 4-8 as the LDBRG1 signal. CPU2 then sends encoded baud rate signals on the data bus 16 to the baud rate generator 6-4. These signals are used to clock data transmitters from the USART 6-2 to the modem 6—6 over signal line XMITDA or to clock data received from the moden 6—6 over signal line RCVDAT to the USART 6-2.

USART 6-2 is connected to the data bus 16 by signals CPUD0−7+00. When addressing USAR 6-2 and CPU 4-2 address signal CPUA01+ is high, control information is on the data bus 16. When address signal CPUA01+ is low it indicates that data information is on the data bus 16. The USART 6-2 reads information from the data bus 16 when logic signal CPURDD, the output of NAND 8-12, is low. The USART 6-2 writes information on the data bus 16 when logic signal 8251WT, the output of a NAND gate 6-8, is low. The inputs to NAND 6-8 are signals CPURWC− from an inverter 6-10 and SRBIT9+, a timing pulse from timing control logic 2—2. The MEMSTR+ timing strobe, the output of timing and control logic 2—2, FIG. 3a, gates the data signals CPUD0−7+0C into the USART 6-2.

In FIG. 3d, the CRT controller and DMA link 12 comprises a CRT controller 12-2, a character generator and vides display 12-10, an address counter 12-14, a register 12—12, a driver 12-16 and a transceiver 12-4. The address counter 12-14 is loaded by the CPU 4-2 which sends out hexadecimal addresses E031 and E032 on address bus 18. This forces logic signal LDADDH+, the output of decoder 4-8, high enabling register 12-12. Address location E031 of ROM 10-2, FIG. 3b, stores the 8 high order bits of the starting RAM 10-4 address for the video display character. These high order bits are read out of ROM 10-2, through register 10-10, transceiver 12-4, FIG. 3d, and are stored in register 12-12 as signals CRTD0−7+10. The CRTD0+10 signal indicates to the timing and control logic 2-2 to initiate a system reset operation when the decoder 4-8 generates a TCRSL− signal. This logic is shown in FIG. 4b. On the next CPU bus cycle, CPU 4-2 sends out address location E032 of ROM 10-2, and the 8 low order bits are read from ROM 10-2 through register 10-10, transceiver 12-4 into counter 12-14. The output of register 12-12, signals DMA08−15, is also stored in counter 12-14, since the enable signal LDADDL is high. The character generator and video display 12-10 is activated each DMA1 cycle. The output of counter 12-14, memory address BDMA0−15+00, appears on address bus 18 through a driver 12-16, junction 18-1, FIG. 3b, register 10-6, register 10-8, and RAM 10-4. Data output signals RAMD0−7+0A input register 10-10, junction 16-3, FIG. 3d, transceiver 12-4, and junction 16-4 to CRT controller 12-2 as data signal CRTD0−7+0A, and to the character generator and video display 12-10 as signals CGBIT0−6. Signal BUSAK1−, the output of a NAND gate 12-18, advances the counter 12-14 to indicate the next RAM 10-4 address location. The timing signals SRBIT4− and SRBIT2+ from timing and control logic 2-2, FIG. 3a, input NAND 12-18 as does the bus acknowledge signal BUSAK1 which outputs an AND gate 12-20. The interrupt and priority logic 4-24 outputs a video request signal VDMARQ− and a DMAK10 signal which assigns the DMA1 bus cycle timing of FIG. 1. These signals input a NAND gate 12-24 whose output VIDACK+ inputs the AND gate 12-20. The other input to AND 12-20 is a CPUADR− signal which is the output of an inverter 12-22 whose input is the control bus 20 timing signal CPUADR+.

Counter 12-14 counts on the rising edge of signal BUSAK1−. Timing signal CPUADR− goes high to start a DMA cycle. Logic signal DMAK10− goes low for the duration of the DMA1 cycle. If the CRT controller and DMA link 12 requests a DMA cycle, request signal DVMARQ− goes low forcing the signal VIDACK+ output of NAND gate 12-24 high. This forces the signal BUSACK1+ output of AND gate 12-20 high since timing signal CPUADR− is high. The BUSACK1+ signal output of AND 12-20 gates the output of driver 12-16, address signals BUSA00−15+0A, to be timed to the DMA1 address bus cycle since the CPUADR− timing signal defines the DMA address bus 18 timing.

Logic signal BUSAK1−, the output of NAND gate 12-18, is normally high. It is forced low at the beginning of the DMA1 address bus 18 cycle when timing signals SRBIT2+ and SRBIT4−, FIG. 4, are high. Logic signal BUSAK1− is forced high when timing signal SRBIT4− goes low thereby incrementing the address stored in counter 12-14.

Up to six options 14a-f may connect to the data bus 16, address bus 18 and control bus 20. Each option may contain an option priority and interrupt logic 14-2, a DMA registers and devices 14-4, and a memory 14-6. Option priority and interrupt logic 14-2 connects to signal lines BUSA01−08+00 of address bus 18 and to signal lines PRIACK−05, DMAREQ2 through DMAREQ4, and EXIRQ of control bus 20. Options are wired to signal lines DMAK20−, DMAK30− or DMAK40− to be operative on DMA2, DMA3 or DMA4 bus cycles respectively.

DMA registers and devices 14-4, FIG. 3c, connects to address bus 18 through a register 14-18 and to data bus 16 through a driver 14-10 and a register 14-8. Control signal BUSRWC connects to the control bus 20 through driver 14-20 to indicate to memory subsystem 10 if the peripheral of options 14a-f will read from or write into memory subsystem 10. DMA registers and devices 14-4 also connects directly to control bus 20. Memory 14-6 connects to the address bus 18 through register 14-18, connects to the data bus through a register 14-12 and a register 14-14, and connects directly to control bus 20.

Driver 14-10 and register 14-14 are enabled during DMA cycles by control signal CPUDAT−. Drivers 14-16 and 14-20 are enabled during DMA cycles by control signals CPUADR−. The appropriate DMA registers and devices 14-4 and memory 14-6 of their respective options 14a-f are connected to the data bus 16, address bus 18 and control bus 20 under control of their respective option priority and interrupt logic 14-2 operating in conjunction with interrupt and priority logic 4-24. The relationship between the peripheral options 14a-f, the data bus 16 and the address bus 18 are disclosed in the related application.

Specific options are wired to be operable on a specific one of the available DMA2-DMA4 cycles, FIG. 1. The options interrupt the CPU by forcing control bus 20 signal EXTIRQ− low thereby signalling interrupt and priority logic 4-24 that an option 14a-f requests service from the CPU 4-2. The options 14a-f forces the DMAREQ 2-4 request signal assigned to the particular option low to indicate to other options wired to be operative on a particular DMA cycle that the option requested the bus.

The options are not described in detail since a complete understanding of their operation is not necessary for the understanding of the invention, but are described only as necessary for someone skilled in the art to understand the complete environment in which the invention operates. A description of the control signals was described previously.

FIG. 4 shows the detailed logic of the timing and control logic 2 which generates the address bus 18, data bus 16 and control bus 20 timings. FIG. 5 is a timing diagram of the pertinent signals.

The oscillator 2-4 output signal is shown in FIG. 5. Each oscillator cycle of the preferred embodiment is 50.85 nanoseconds. This value is chosen to be compatible with the baud rate generator 6-4, FIG. 3. The invention described herein, however, is not limited to this value of oscillator cycle timing.

Twenty oscillator output cycles of 1.017 microseconds define 1 CPU and 1 DMA cycle and are identified in FIG. 5 as time slots 0 through 19.

In FIG. 4, the oscillator 2-4 19.66 megahertz output is applied to the clock terminal of a shift register 2-6. The shift register 2-6 output, timing signals SRBIT0+ through SRBIT9+, is shown in FIG. 5.

Signals CPUPH1+ and CPUPH2+ are used as clock timing signals for the CPU 2-4. An AND gate 2-8 output signal CPUPH1+ is high when timing signal SRBIT0+ is high and signal CPUPH2− is high. When timing signal SRBIT0+ goes low during time slot 10 of FIG. 5, the output of AND 2-8, signal CPUPH1+, goes low. An inverter 2-10 output signal CPUPH1− goes high as does an inverter 2-16 output signal SRBIT0−. Since both inputs to an AND gate 2-12 are high, the output signal CPUPH2 goes high. When signal SRBIT0− goes low, the output signal CPUPH2 of AND 2-12 goes low forcing the output of an inverter 2-14 high, again forcing the output signal CPUPH1 of AND 2-8 high. CPU 2-4 timing signals CPUPH1 and CPUPH2 continue to cycle as shown in FIG. 5.

Timing signals CPUADR+ and CPUADR−, the output of a flop 2-18, generate the address bus 18 timing through control of drivers 4-4, 4-6, and 4-10 of FIG. 3a, 12-16 of FIG. 3d, and 14-16 and 14-20 of FIG. 3c. The oscillator 2-4 output signal is connected to the CLOCK input of flop 2-18 and the SRBIT4+ timing signal is connected to the CD input. The flop 2-18 sets on the next rise of the oscillator 2-4 output signal following the rise of the SRBIT4+ timing signal. Flop 2-18 resets on the next rise of the oscillator 2-4 output signal following the fall of the SRBIT4+ timing signal.

FIG. 5 shows the address output signals CPUA00−15+ of the CPU 2-4 which were generated using the CPUPH1+ and CPUPH2+ timing signals, the CPUADR− signal which gates the CPUA00−15+00 address signals, and the address bus 18 signals BUSA00−17 which shows the valid CPU address.

FIG. 5 also show the valid DMA address signals BUSA00−17 when the CPUADR− timing signal is high. This valid DMA address is the gated output of driver 12-16, FIG. 3d, and also the gated output drivers 14-16 and 14-20 of options 14a-f, FIG. 3e.

A flop 2-20 generates the data bus 16 timing signals CPUDAT− and CPUDAT+. Flop 2-20 sets on the rise of the oscillator 2-4 clock following the clock cycle in which timing signal SRBIT0+ goes high and resets on the rise of the oscillator 2-4 clock following the clock cycle in which timing signal SRBIT0+ goes low. FIG. 5 shows the CPUDAT− signal defining the DMA data cycle when high and the CPU data cycle when low. The transceiver 4-18, FIG. 3a, controls the data bus 16 timing during the CPU cycle through control of the ENABLE terminal by the ENBDAT+ output of NAND 4-16 which is conditioned by the timing signal CPUDAT+. The CPUDAT− signal provides the DMA cycle timing for the data bus 16 by controlling the outputs of register 14-14, FIG. 3c, and driver 14-10 by signal CPUDAT−, and by controlling the WRITE input to CRT controller 12-2, FIG. 3d. The BUSAK1−02 output signal of a NAND 12-21 is low during the DMA1 cycle, FIG. 5. The output of a NAND 12-30 signal VIOWRT− is low when logic signal BUS030− is low thereby defining the DMA data bus 16 cycle time for the DMA1 video display cycle from cycle 6 time through cycle 11 time, FIG. 5.

Timing signals SRBIT2+ and SRBIT4+ input an AND gate 12-26, FIG. 3d, whose output signal T05T12+ inputs NAND 12-21 thereby generating the BUSAK1−02 output signal.

The memory strobe signal MEMSTR− is generated by a flop 2-22. Timing signals SRBIT6+ and SRBIT9+ input an EXCLUSIVE OR gate 2-32, FIG. 4a, whose output signal TX7TX9 is connected to the CD terminal of flop 2-22, FIG. 4b. The flop sets on the rise of the oscillator 2-4 clock following the cycle in which the TX7TX9 timing signal goes high and resets on the rise of the oscillator 2-4 clock following the cycle in which TX7TX9 timing signal goes low. Signal MEMSTR— in FIG. 5 shows the timing of the flop 2-22. The MEMSTR— signal connects to the output control terminal of register 10-10, FIG. 3b, and controls the timing of the data signals BUSD0—7+0B. In FIG. 5, the BUSD0—7+ DMA DATA READ and CPU DATA READ signals show this timing. DMA DATA READ is responsive to a VALID DMA ADDRESS and CPU DATA READ is responsive to a VALID CPU ADDRESS. The MEMSTR+ output signal of flop 2-22, FIG. 4b, is a timing signal for USART 6-2, FIG. 3e.

A flop 2-28, FIG. 4b, generates the BUS030 timing signals. Timing signals SRBIT0— and SRBIT4+ input an EXCLUSIVE OR 2-38 whose output signal TX1TX4 is connected to the CD terminal of flop 2-28. Flop 2-28 is set at cycle time 5, the cycle after signal SR4+ goes high, BUS030— timing, FIG. 5, and reset at cycle time 11, the cycle after signal SRBIT0+ goes low. As described above, signal BUS030— defines the DMA1 data bus 16 cycle during a CRT controller 12-2 write cycle. Signal BUS030+ also controls the memory subsystem 10 output data duration on the data bus 16 during a memory read operation by controlling the output of register 10-10, FIG. 3b. Signal BUS030+ performs similar timing functions in memory 14-6 and DMA registers and devices 14-4 of options 14a-f, FIG. 3c.

A flop 2-26 generates the device strobe signal DEVSTR— for use in options 14a-f. It is set and reset with the same timings as the MEMSTR flop 2-22, and times the options 14a-f to the address bus 16 and the data bus 18.

A flop 2-24 establishes the timing for refreshing memory 10 and memory 14-6 in options 14a-f through the BUSREF+ signal.

Figure 4A:
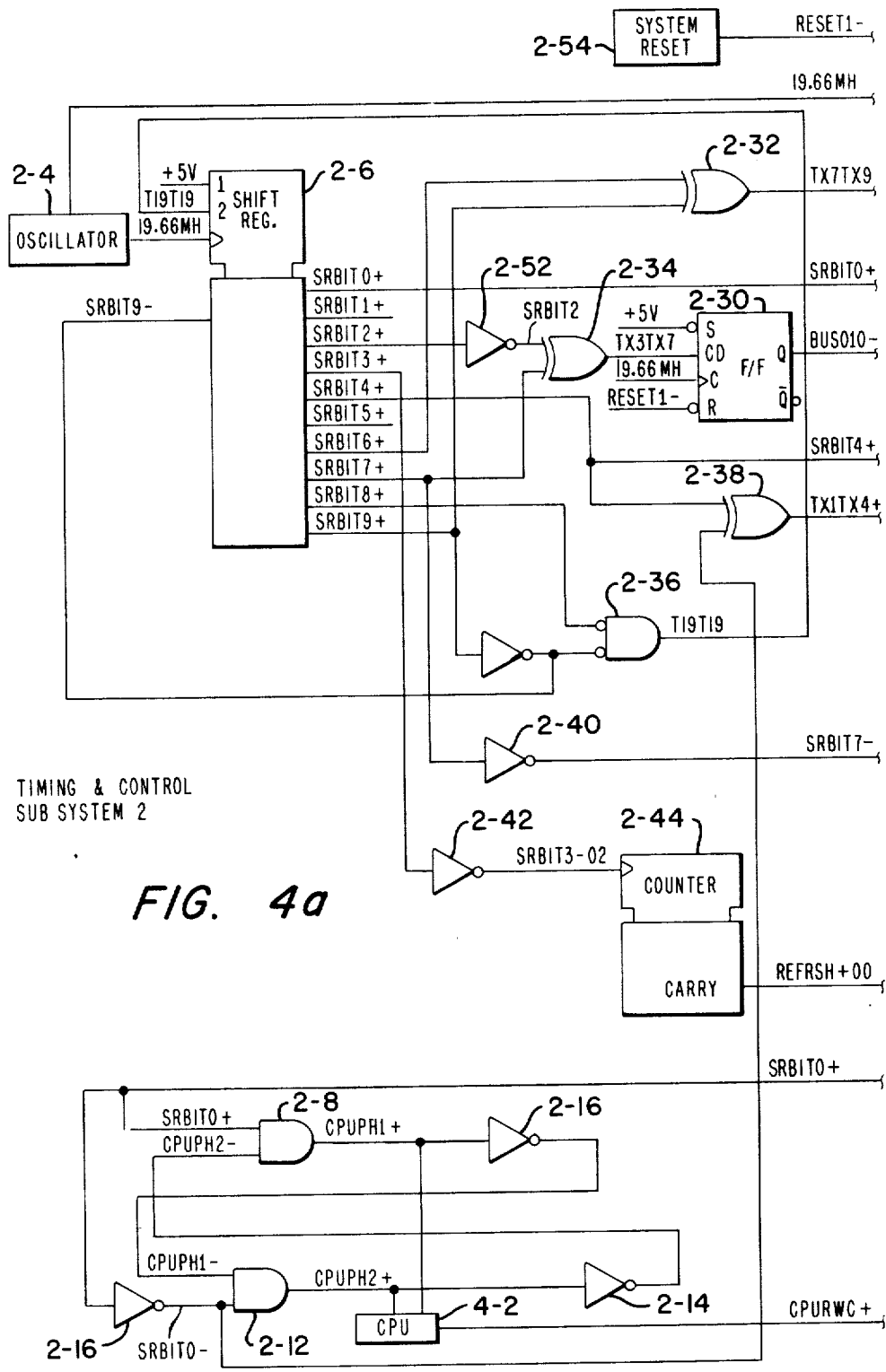
FIG. 4 is a logic diagram of the timing and control unit.
Figure 4B:
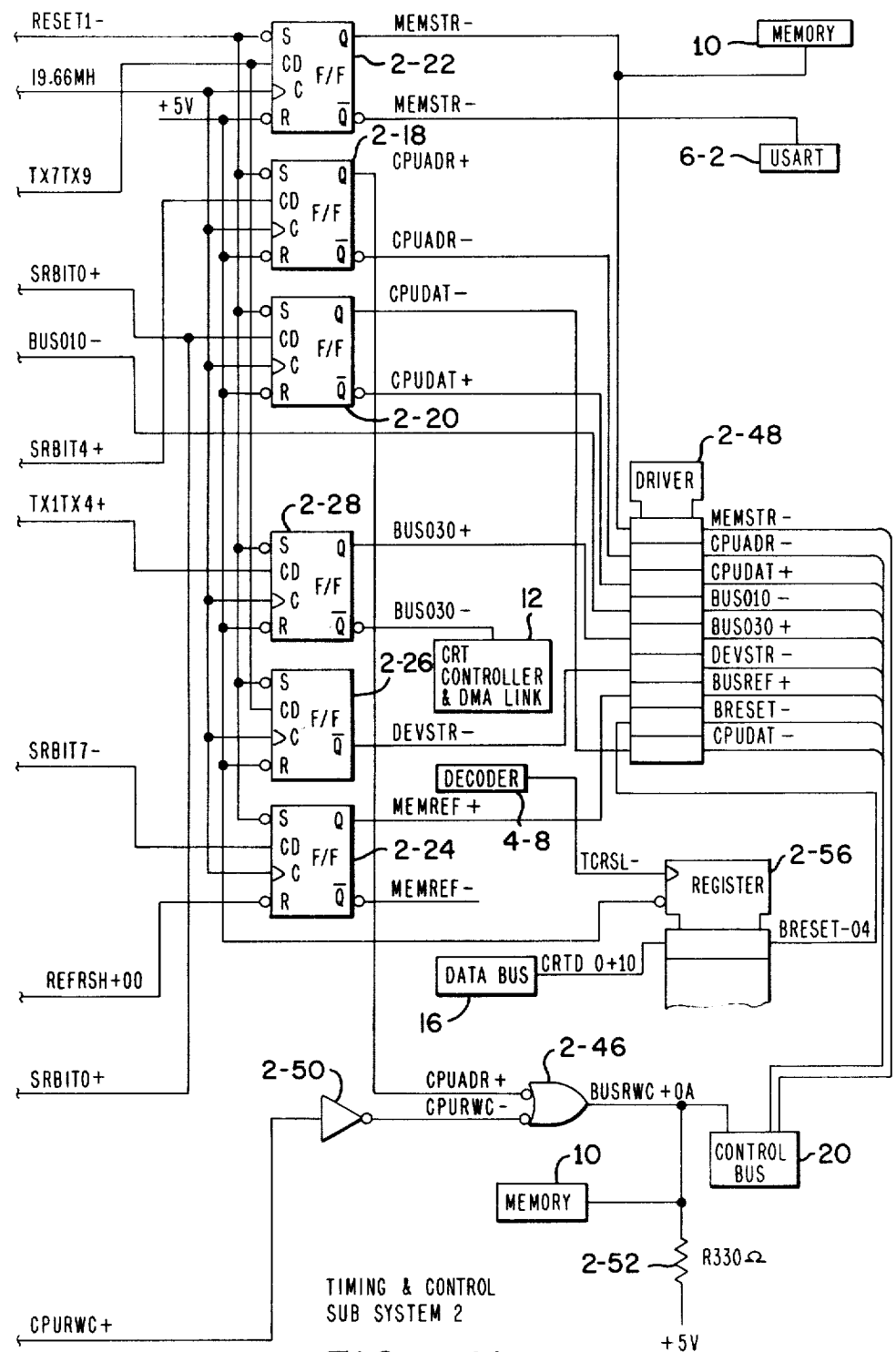
Figure 5:
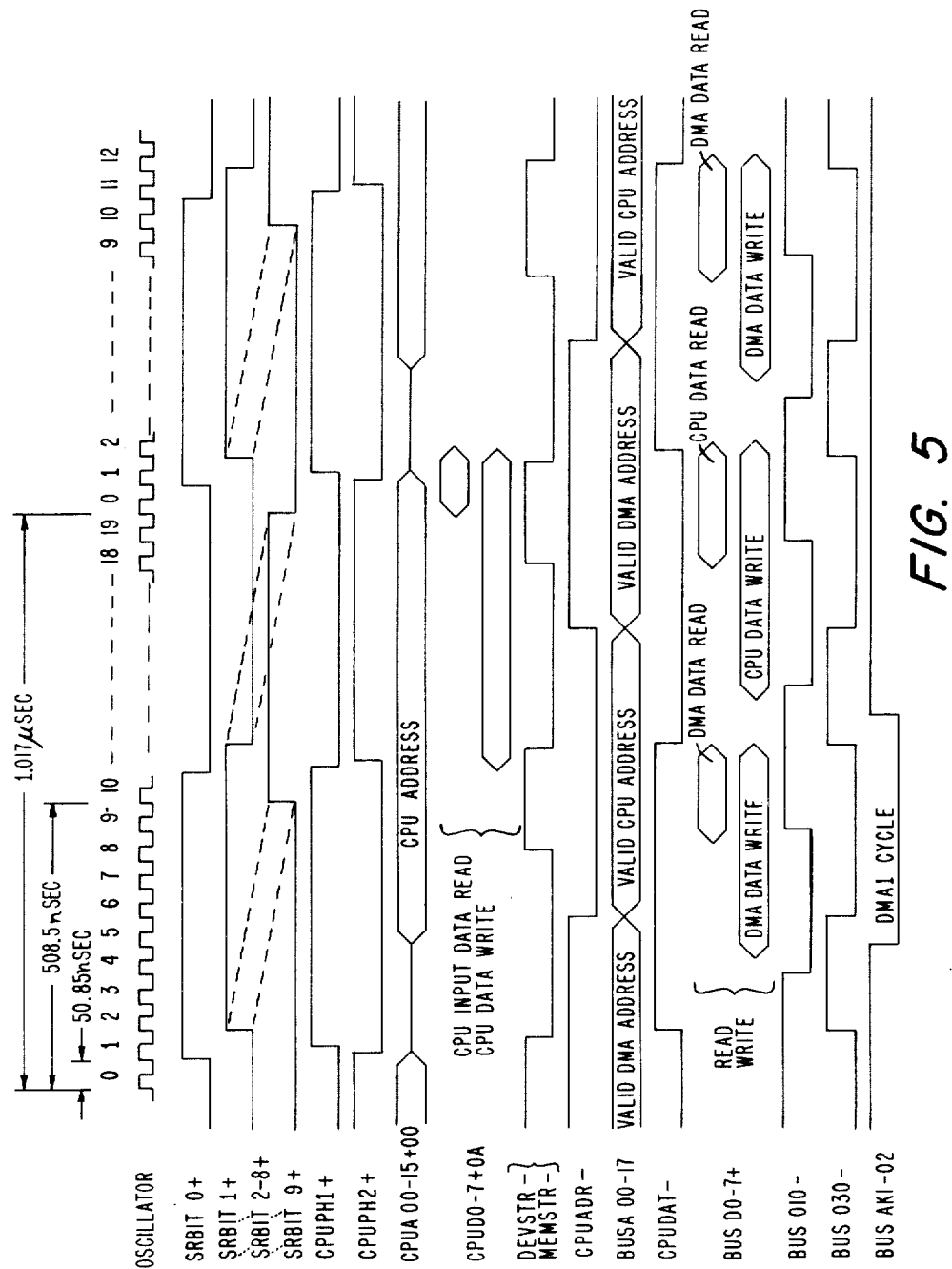
FIG. 5 is a timing diagram of the system bus signals.

A flop 2-30, FIG. 4a, generates the BUS010— timing signal for options 14a-f. Signals SRBIT2— and SRBIT7+ input to EXCLUSIVE OR 2-34 whose output signal TX3TX7 connects to the CD terminal of flop 2-30. Flop 2-30 resets on the cycle after the rise of the SRBIT2+ signal and sets on the cycle after the next rise of the SRBIT7+ signal. The timing signal SRBIT2— is generated by an inverter 2-52 inverting the SRBIT2+ signal.

The bus read write control signal BUSRWC+ output of a NOR 2-46 is generated from the CPURWC+ signal from CPU 4-2. Signal CPURWC+ is inverted by an inverter 2-50 whose output signal CPURWC— inputs NOR 2-46. Signal CPUADR+ inputs the other terminal of NOR 2-46. During a CPU bus cycle, signal CPUADR+ is high. Therefore, the output signal BUSRWC is controlled by the CPURWC— signal which is low when information is read from memory subsystem 10 to the CPU 4-2, thereby forcing the control bus 20 BUSRWC+ signal high. When the CPUADR+ signal is low indicating a DMA cycle, then the output of NOR 2-46 is high. In this case the options 14a-f generate the BUSRWC+ signal on control bus 20 which is forced low when data is to be writted into memory subsystem 10 from an option 14a-f device. A 330 ohm resistor 2-52 holds the BUSRWC+ signal line high when an option 14a-f device has an inactive DMA cycle.

A system reset 2-54, FIG. 4a, generates a RESET-signal for resetting all flops in timing and control subsystem 2. In addition, the CPU 4-2 can clear all registers in the options 14a-f devices by sending an address to the decoder 4-8. This generates a TCRSL— signal to enable a register 2-56 which stores the data bus 16 signal CRTD00+10 and outputs it as signal BRESET—0A which inputs a driver 2-48. The driver 2-48 sends the aforementioned control signals out on control bus 20.

While in accordance with the provisions and statutes there has been illustrated and described the best form of the invention known, certain changes may be made to the system described without departing from the spirit of the invention as set forth in the appended claims. In some cases, certain features of the invention may be used to advantage without a corresponding use of other features.

What is claimed is:

1. A method for generating a split bus timing cycle in a terminal system having:
   a system bus including a control bus, an address bus and a data bus;
   a memory subsystem coupled to said system bus;
   a central processor subsystem coupled to said system bus and to said memory subsystem;
   a plurality of peripheral subsystems coupled to said system bus and to said memory subsystem;
   timing means, coupled to said control bus including:
   a clock generator;
   a shift register;
   a plurality of storage elements;
   said method comprising the steps of:
   a. generating successive clocking signals as an output of said clock generator;
   b. applying said successive clocking signals to said shift register;
   c. generating a plurality of first and second shift register signals from said shift register stages, each of said plurality of shift register signals being in a first state for a first predetermined number of said clocking signals and being in a second state for a second predetermined number of clocking signals;
   d. setting a first storage element when said first of said shift register signals is in a first state and resetting said first storage element when said first of said shift register signals is in a second state, said first storage element setting and resetting on the rise of said clocking signals;
   e. setting a second storage element when said second of said shift register signals is in a first state and resetting said second storage element when said second of said shift register signals is in a second state on the rise of said clocking signals;
   f. applying the output of said first storage element to said central processor subsystem when said first storage element is reset and applying the output of said first storage element to said plurality of peripheral subsystems when said first storage element is set;
   g. applying the output of said second storage element to said central processor subsystem when said second storage element is set and applying the output of said second storage element to said plurality of peripheral subsystems when said second storage element is reset;
   h. gating said central processor subsystem address signals by the output of said first storage element when said first storage element is set thereby generating an address bus CPU cycle.
i. gating said plurality of peripheral subsystem address signals by the output of said first storage element when said first storage element is reset thereby generating an address bus DMA timing cycle;
j. gating the signals representative of a data transfer between said central processor subsystem and said main memory subsystem by the output of said second storage element when said second storage element is reset thereby generating a data bus CPU timing cycle;
k. gating the signals representative of a data transfer between one of said plurality of peripheral subsystems and said main memory subsystem by the output of said second storage element when said second storage element is set thereby generating a data bus DMA timing cycle;
i. applying said second shift register signal in said first state and a second phase timing signal in a second state to a first AND gate for generating a first phase timing signal in a first state for defining a CPU phase timing cycle, wherein said address bus DMA timing cycle and said data bus DMA timing cycle overlap said CPU phase timing cycle; and,
m. applying said second shift register signal in said second state and said first phase timing signal in a second state to a second AND gate for generating said second phase timing signal in a first state, said second phase timing signal in said first state being applied to said first AND gate for generating said first phase timing signal in a second state for defining a DMA phase timing cycle, wherein said address bus CPU timing cycle and said data bus CPU timing cycle overlap said DMA phase timing cycle.

2. The method of claim 1 wherein said split bus cycle timing is generated by:
a. setting said first storage element with said first shift register signal in said first state for generating said address bus CPU cycle and resetting said second storage element with said second shift register signal in said second state for generating said data bus CPU cycle, said second shift register signal lagging said first shift register signal by 305 nanoseconds; and,
b. resetting said first storage element with said first shift register signal in said second state for generating said address bus DMA cycle, and setting said second storage element with said second shift register signal in said first state for generating said data bus DMA cycle.

* * * * *